(12) United States Patent
McDaniel et al.

(10) Patent No.: US 7,981,832 B2
(45) Date of Patent: Jul. 19, 2011

(54) METHODS OF ACTIVATING CHROMIUM CATALYSTS

(75) Inventors: Max P. McDaniel, Bartlesville, OK (US); Elizabeth A. Benham, Spring, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 12/565,559

(22) Filed: Sep. 23, 2009

(65) Prior Publication Data

US 2010/0075840 A1 Mar. 25, 2010

Related U.S. Application Data

(62) Division of application No. 11/122,716, filed on May 5, 2005, now Pat. No. 7,615,510.

(60) Provisional application No. 60/570,521, filed on May 12, 2004.

(51) Int. Cl.
| | |
|---|---|
| B01J 20/34 | (2006.01) |
| B01J 21/20 | (2006.01) |
| B01J 23/90 | (2006.01) |
| B01J 25/04 | (2006.01) |
| B01J 27/28 | (2006.01) |
| B01J 29/90 | (2006.01) |
| B01J 31/40 | (2006.01) |
| B01J 38/00 | (2006.01) |
| B01J 38/04 | (2006.01) |
| B01J 38/42 | (2006.01) |
| B01J 38/20 | (2006.01) |

(52) U.S. Cl. ............. 502/305; 502/20; 502/34; 502/35; 502/49

(58) Field of Classification Search .................. 502/20, 502/34, 35, 49, 305

See application file for complete search history.

(56) References Cited

U.S. PATENT DOCUMENTS

| | | | |
|---|---|---|---|
| 2,951,816 | A | 9/1960 | Hogan et al. |
| 3,248,179 | A | 4/1966 | Norwood |
| 3,281,405 | A | 10/1966 | Hogan |
| 3,362,946 | A | 1/1968 | Hogan |
| 3,446,754 | A | 5/1969 | Solvik et al. |
| 3,624,063 | A | 11/1971 | Witt |
| 4,022,580 | A | 5/1977 | Rush |

(Continued)

FOREIGN PATENT DOCUMENTS

EP 0857737 A1 8/1998

(Continued)

OTHER PUBLICATIONS

Bird, R. Byron, et al., "Dynamics of Polymeric Liquids," vol. 1, Fluid Mechanics, Second Edition, 1987, Cover and publishing info (2 pages), xiii-xviii, and pp. 171-172, Wiley-Interscience Publications, John Wiley & Sons.

(Continued)

*Primary Examiner* — Patricia L Hailey
(74) *Attorney, Agent, or Firm* — Conley Rose, P.C.; Rodney B. Carroll; Cheryl L. Huseman

(57) ABSTRACT

New methods for activating chromium catalysts for polymerization processes decrease the amount of time required for activation and increase catalyst activity. Rapid heating to a first temperature is followed by a first hold period before heating to a higher second temperature and maintaining the second temperature for a second hold period. In one aspect, the overall activation process takes less than 10 hours.

22 Claims, 4 Drawing Sheets

U.S. PATENT DOCUMENTS

| | | | |
|---|---|---|---|
| 4,041,224 | A | 8/1977 | Hoff et al. |
| 4,136,061 | A | 1/1979 | Hogan et al. |
| 4,151,122 | A | 4/1979 | McDaniel et al. |
| 4,247,421 | A | 1/1981 | McDaniel et al. |
| 4,296,001 | A | 10/1981 | Hawley |
| 4,397,769 | A | 8/1983 | McDaniel et al. |
| 4,424,341 | A | 1/1984 | Hanson et al. |
| 4,501,885 | A | 2/1985 | Sherk et al. |
| 4,613,484 | A | 9/1986 | Ayres et al. |
| 4,737,280 | A | 4/1988 | Hanson |
| 5,006,506 | A | 4/1991 | Hsieh et al. |
| 5,200,478 | A | 4/1993 | Vogels et al. |
| 5,565,175 | A | 10/1996 | Hottovy et al. |
| 5,597,892 | A | 1/1997 | Hanson |
| 6,239,235 | B1 | 5/2001 | Hottovy et al. |
| 6,359,085 | B1 | 3/2002 | Lhost et al. |
| 6,617,404 | B2 | 9/2003 | Shveima |
| 7,223,823 | B2 | 5/2007 | Lin |
| 7,271,122 | B2 | 9/2007 | Bodart et al. |
| 7,384,885 | B2 | 6/2008 | Roger et al. |
| 7,615,510 | B2 | 11/2009 | McDaniel et al. |
| 2005/0192177 | A1* | 9/2005 | Roger et al. .................... 502/38 |

FOREIGN PATENT DOCUMENTS

| | | |
|---|---|---|
| EP | 0882740 A1 | 12/1998 |
| WO | 2005113146 A1 | 12/2005 |

OTHER PUBLICATIONS

Foreign communication from a related counterpart application—International Preliminary Report on Patentability, PCT/US2005/016108, 9 pages, Nov. 14, 2006.

Foreign communication from a related counterpart application—International Search Report and Written Opinion, PCT/US2005/016108, 12 pages, Sep. 27, 2005.

Hieber, C.A., et al., "Shear-rate-dependence modeling of polymer melt viscosity," Polymer Engineering and Science, Jul. 1992, vol. 32, No. 14, pp. 931-938.

Hieber, C.A., et al., "Some correlations involving the shear viscosity of polystyrene melts," Rheologica Acta, 1989, vol. 28, pp. 321-332.

McDaniel, M.P., et al., "The Activation of the Phillips Polymerization Catalyst," Journal of Catalysis, 1983, vol. 82, pp. 118-126.

McDaniel, M.P., "The State of Cr(VI) on the Phillips Polymerization Catalyst, IV. Saturation Coverage," Journal of Catalysis, 1982, vol. 76, pp. 37-47, Academic Press.

McDaniel, Max P., "Excess Oxygen of Chromia, I," Journal of Catalysis, 1975, vol. 36, pp. 394-403, Academic Press.

McDaniel, Max P., "Excess Oxygen of Chromia, II. Reaction with Dephenylpicrylhydrazine," Journal of Catalysis, 1975, vol. 36, pp. 404-412, Academic Press.

Welch, M. B., et al., "The Activation of the Phillips Polymerization Catalyst, II. Activation by Reduction/Reoxidation," Journal of Catalysis, 1983, vol. 82, pp. 110-117, Academic Press.

* cited by examiner

METHODS OF ACTIVATING CHROMIUM CATALYSTS

CROSS-REFERENCE TO RELATED APPLICATION

This is a Divisional Application of U.S. patent application Ser. No. 11/122,716, filed May 5, 2005 and published as US 2005/0255987 A1, and entitled "Methods of Activating Chromium Catalysts," which claims priority to U.S. Provisional Patent Application Ser. No. 60/570,521 "New Resins and Catalysts from Improved Activation Methods," filed May 12, 2004, each of the foregoing applications is hereby incorporated by reference herein in its entirety.

TECHNICAL FIELD OF THE INVENTION

The present invention relates to chromium catalysts, methods for activating chromium catalysts, and polymerization processes utilizing these activated chromium catalysts. Chromium catalysts are used worldwide to produce high density polyethylene.

BACKGROUND OF THE INVENTION

Chromium catalysts are used throughout the world for the polymerization of polyethylene. Catalyst manufacturers prepare the catalysts, often by placing the chromium on a solid support, such as alumina or silica. The support helps to stabilize the activity of the chromium and allows the catalyst to be shipped in an inactive form to the purchaser. Once the catalyst arrives at a polymer manufacturing site, it must be activated for use in the polymerization process. Typical commercial activation processes consist of activating chromium catalysts by calcining or heating large quantities of the catalyst in dry air. Activation is performed in some type of activation apparatus or vessel such as a fluidized bed activator. This procedure may involve large and expensive equipment in which the catalyst is heated over a period of time or "ramped up" to an activation temperature of 600-900° C. The ramp up is conducted slowly over a period of many hours and then the temperature is maintained typically for another 12 hours. The catalyst is then cooled down and discharged from the activator equipment. The entire procedure generally requires 36 hours to complete one cycle. Decreasing the amount of time required to activate the catalyst would shorten the process cycle time and increase the productivity of the catalyst activating equipment.

SUMMARY OF THE INVENTION

The present invention relates to rapid activation methods for chromium catalysts and the reduction of the activation process time resulting in the improvement of activator equipment output.

Novel activation processes of the present invention comprise subjecting a catalyst to a first stage comprising a first ramp up time to a first desired temperature maintaining the first temperature for a first hold period, followed by subjecting the catalyst to at least a second stage comprising a second ramp up time to a second desired temperature, maintaining the second temperature for a second hold period, wherein the second temperature is greater than or equal to the first temperature and a total activation cycle comprises less than 30 hours.

The process can further comprise independently conducting any stage of the process in at least one atmosphere. The atmosphere can be independently introduced during the ramp up time or the hold period of any stage.

The process further comprises following the second stage with a third stage comprising a third ramp up time to a third temperature of less than 1000° C. and holding for a third hold period in an oxidizing atmosphere.

Additional aspects include catalyst activation processes comprising instantaneously subjecting a catalyst to a first stage comprising a first temperature in at least one first atmosphere, maintaining the first temperature for a first hold period followed by instantaneously subjecting the catalyst to at least a second stage comprising a second atmosphere and a second desired temperature that is greater than the first temperature and less than or equal to about 1000° C., and maintaining the second temperature for a second hold period.

Another aspect of the invention includes chromium catalyst activation processes comprising at least 2 stages wherein a first stage comprises instantaneously introducing a catalyst to an ambient atmosphere previously heated to a temperature of about 600° C., holding the temperature for about 1 hour to about 20 hours, followed by a second stage comprising raising the temperature to a range from about 800° C. to about 900° C. over a period of about 0 hours to about 3 hours, holding the temperature for a range of about 1 hour to about 10 hours, wherein the process is performed in a batch mode or a continuous mode.

DETAILED DESCRIPTION OF THE INVENTION

Figure 1:
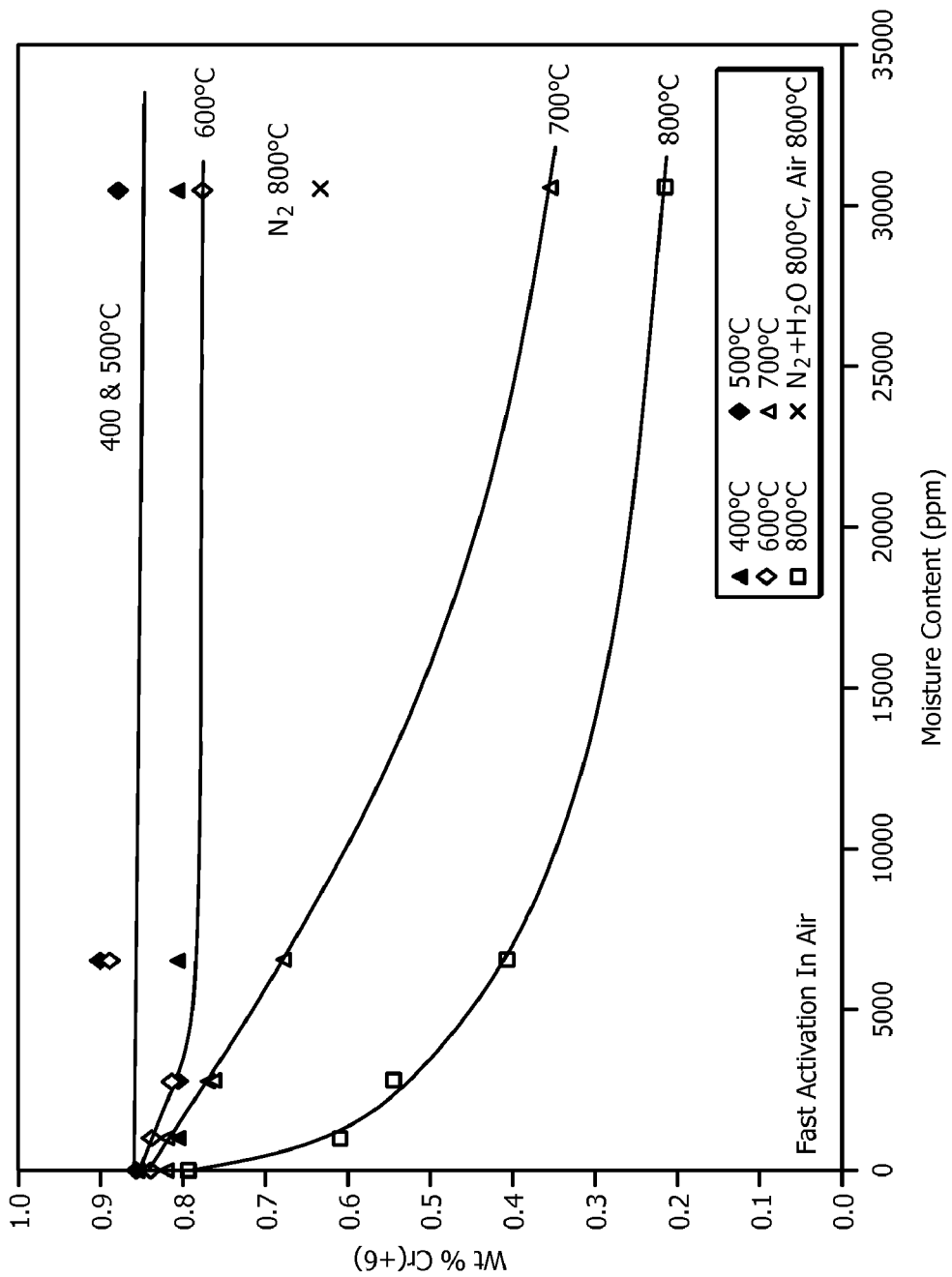
FIG. 1 is a graphic representation of the sensitivity of a chromium/silica catalyst to moisture at various temperatures.

The purpose of activation of chromium catalysts is dehydroxylation of the catalyst support and oxidation of any of the trivalent form of chromium, Cr(+3) to the hexavalent form, Cr (+6) and then stabilization of the Cr (+6) form. For purposes of the invention, the term "stabilization" refers to this activation process resulting in the Chromium(+6) form of the catalyst. Prior to activation, a commercial catalyst can contain a total of about 0.2 to about 2.0% trivalent chromium by weight. Most frequently such catalysts contain about 1% Cr by weight. From these 1% Cr catalysts, a stabilization process yielding 0.6 to 0.8 wt % Cr(6+) is considered desirable. That is, it is considered desirable when at least 60% of the total Cr is converted to Cr(+6) during the activation. This value is referred to herein as the percent conversion to Cr(+6). For efficiency, the present commercial process activates catalysts in large volumes, for example, 500 to 1200 pounds (363 to 544 Kg), and requires slowly heating up to a high temperature, typically around 800° C., over a long period of time, typically around 36 hours. These high volume commercial activations at around 800° C. usually produce catalysts containing from about 0.4 to about 0.6% Cr(+6) and can require 36 hours to complete. In general, an activation process that yields greater than 0.4 wt. % (or 40% conversion) Cr(+6) is considered commercially acceptable.

The activation cycle is extensive because Cr (+6) is thermally unstable. The hexavalent oxide itself, $CrO_3$, decomposes into $Cr(3+)$ and $O_2$ when heated above 200° C. When chromium is placed on a support such as a silica or alumina surface, the compound is stabilized and can endure even up to 900° C. if there is an absence of moisture. Moisture is known to be a significant impediment to achieving high stabilization to Cr(+6). When even traces of moisture are present, the chromate ester can be hydrolyzed and Cr (+6) can again decompose to Cr (3+). Placing the chromium on a support does not eliminate the influence of the moisture because the support surface, for example, silica, releases moisture as it is heated to progressively higher temperatures. The deeper the area containing the catalyst in the catalyst activator equipment (referred to as the catalyst bed), the more moisture is released. This makes it difficult to achieve high stabilization and high output simultaneously in a commercial activator. Therefore, commercial activation methods generally proceed over extended periods of time to minimize the effect of moisture on the catalyst and the Cr(+6) stabilization. The total activation of the catalyst at high temperature typically takes a total of 36 hours.

The present invention relates to rapid activation methods for chromium catalysts, resulting in the reduction of the activator process time and the improvement of activator equipment output.

Various types of activator equipment or apparatus can be used to activate catalysts for the present invention. Such equipment can include any vessel or apparatus including, but not limited to, rotary calciners, static pan drying, and fluidized beds. Such equipment can operate in a static or batch mode, or in a continuous mode. In the case of a static or batch mode, a vessel or apparatus containing the catalyst bed can be subjected sequentially to various stages of the activation process. For a continuous mode, the stages of the process can occur in a series of zones through which the catalyst passes on its path through the activation apparatus.

In a fluidized bed activator, gas flows upward through a grid plate containing many small holes upon which the supported catalyst is positioned. The gas can contain various compounds to create a desirable atmosphere. The catalyst is mixed in the gas as it flows creating a fluid-like flow. This is often referred to as fluidization or fluidizing. The gas flow for fluidized bed activators can range from about 0.01 to about 1 foot per second (0.01 to 30 cm/sec). Alternatively, the gas velocity can range from about 0.05 to about 0.5 ft/sec (1.5 to 15 cm/sec), or from about 0.1 to about 0.3 ft/sec (3-9 cm/sec).

Catalysts suitable for the present invention include any catalysts suitable for polymerizing polyolefins and comprising chromium on a support. The chromium content can range from about 0.1 to about 10% by weight based upon the total weight of the catalyst. Alternatively, the chromium content can range from about 0.2 to about 5% by weight, or about 0.5 to about 2% by weight. Suitable supports for chromium catalysts of the present invention include, but are not limited to, silica, alumina, aluminophosphates, metal oxides such as oxides of titanium, zirconium, boron, zinc, magnesium, and the like, or combinations thereof. Suitable supports may also contain other promoters including, but not limited to, fluoride, sulfate, fluoroborates, silicofluorides and the like. Suitable catalysts can be purchased from commercial sources such as the Grace Davison Division of W. R. Grace & Company, Columbia, Md.

Catalysts activated according to the present invention typically have 40 to 100% of the total chromium converted to the hexavalent form after activation at 750° C. to 900° C. In another aspect, conversion of 50% to 100% of total Cr to Cr(+6) is achieved. In yet another aspect, conversions of 60% to 100% are achieved at 750° C. to 900° C. and in still another aspect conversions of 80 to 100% are achieved. It is known that high conversions are more easily achieved at lower temperatures (see M. P. McDaniel; The State of Cr(VI) on the Phillips Polymerization Catalyst IV. Saturation Coverage; *J. Catal.* 76, 37 (1982)).

Activations conducted according to the present invention comprise heating the catalyst to a final desired temperature in two or optionally three stages. For purposes of the invention, the term "stage" refers to heating a catalyst to a desired temperature and then maintaining that temperature for a period of time. A stage can be performed when the catalyst is in a stationary position or by moving the catalyst through various locations. A first stage comprises a first ramp up time (R1) to a first desired temperature (T1), and maintaining the catalyst at that temperature for a first hold period (H1). For purposes of the invention, the term "ramp up time" refers to a period of time over which the temperature is increased and the terms "hold time" and "hold period" are considered interchangeable. Following the first stage the catalyst is subjected to at least a second stage comprising a second ramp up time (R2), to a second temperature (T2), and a second hold period (H2).

The activation processes of the present invention further comprise independently conducting any stage of the process in at least one atmosphere. The atmosphere can be independently introduced during the ramp up time or the hold period of any stage.

Optionally, the process comprises a third stage comprising a third ramp up time (R3), to a third temperature, (T3) and a third hold period (H3). According to this invention it can be advantageous for the third stage or the last performed stage of the process to be conducted in an oxidizing atmosphere.

Any of the aspects of the present invention can further comprise a final reducing treatment following the last holding period of the activation process. The final reducing treatment comprises introducing the catalyst to a reducing atmosphere for a period of time ranging from about 10 minutes to about 5 hours. The reducing atmosphere can comprise pure CO or CO in mixtures with other inert gasses. Introducing the catalyst to the reducing atmosphere can comprise exchanging the atmosphere within an activation vessel, or any other commercially acceptable process for introducing the catalyst to the reducing atmosphere. The reducing step can be performed in temperatures ranging from about 200° C. to about 500° C.

The ramp up times, R1, R2 and R3, can be the same amount of time or they can each be independently different. The range for any ramp up time can be instantaneous to less than or equal to 3 hours. In one aspect of this invention any ramp up time can be less than 3 hours. In another aspect any ramp up time can be less than or equal to about one hour. In another aspect, any ramp up time can be instantaneous, or about zero hours. When the ramp up time is instantaneous or about 0 hours, the catalyst is introduced into a pre-heated environment. For purposes of the invention, the term "instantaneous" refers to introducing the catalyst to a pre-heated environment wherein the ramp up time would be negligible or about 0 hours.

For purposes of the invention, the first temperature can be in a range of less than or equal to 500° C. to less than or equal to 700° C. In one aspect of this invention the first stage temperature (T1) is less than about 700° C. In another aspect, T1 is less than about 600° C. and in still another aspect, T1 is less than about 500° C. The second stage temperature (T2) can be any temperature greater than or equal to T1 and less than or equal to 1000° C. In one aspect of this invention T2 is less than about 1000° C. In another aspect T2 is from about 600° C. to about 900° C. In still another aspect T2 is from about 700° C. to about 870° C. In still another aspect T2 is 750° C. to 850° C. For any third stage, the third temperature (T3) is the highest temperature to which the catalyst is exposed and is less than or equal to 1000° C. In one aspect of this invention T3 is less than about 1000° C. In another aspect T3 is from about 600° C. to about 900° C. In still another aspect T3 is from about 700° C. to about 870° C. In still another aspect T3 is 750° C. to 850° C.

The hold periods can also be varied independently. That is, H1, H2 and H3 can be the same or different. Any hold period can range from 1 minute to about 30 hours. In one aspect any hold period can range from about 1 minute to about 30 hours. In another aspect any hold period can range from about 10 minutes to about 8 hours, and in another aspect any hold period can range from about 30 minutes to about 3 hours.

Activation of catalysts of the present invention can occur in various atmospheres. The atmosphere can vary independently during various stages of the activation process, or the atmosphere can remain consistent throughout all stages of the process. Atmospheres can comprise oxidizing, inert, and reducing compounds. The relevant atmosphere can be introduced independently to the activation process during any part of any stage, such as during the ramp up time or during the hold period for any stage of the process. For example, an atmosphere can be introduced during the hold period of the first stage and an atmosphere can be introduced during the ramp up time of the second stage and then another atmosphere introduced during the hold period of the second stage.

Each stage can be conducted independently in an oxidizing, an inert, or a reducing atmosphere, however, it is advantageous for the final stage of the process to be conducted in an oxidizing atmosphere. When the invention comprises a third stage, it can be advantageous to use an oxidizing atmosphere.

This invention further comprises optionally following a last stage of a process with a step comprising subjecting the catalyst to a reduction at 200° C. to 500° C. in a reducing atmosphere such as carbon monoxide for about 10 minutes to about 5 hours.

Oxidizing atmospheres can include pure oxygen or ambient air containing oxygen. Substantially anhydrous air can be used. The term dry air refers to substantially anhydrous air. Gas containing from about 5 to about 100% oxygen can be used. Alternatively the gas can contain from about 10 to about 50% oxygen, or from about 15% to about 30% oxygen. For purposes of the invention, the term "air" refers to an oxidizing atmosphere. Other oxidizing compounds that can be used in an oxidizing atmosphere include, but are not limited to, nitrous oxide ($N_2O$), nitrogen dioxide ($NO_2$), nitric oxide (NO), oxygen containing halide compounds such as iodine pentoxide ($I_2O_5$) or chlorine monoxide ($Cl_2O$) and other materials which release oxygen. An oxidizing atmosphere can comprise any combinations of the foregoing compounds.

Inert atmospheres can include, but are not limited to, carbon dioxide ($CO_2$), vacuum, helium, argon and nitrogen. Any combination is also appropriate.

Reducing atmospheres include, but are not limited to, carbon monoxide (CO), hydrogen (H2), and materials that decompose to CO, C and H2. Suitable materials include hydrocarbons, alcohols, ammonia and carboxylic acids. Any combination is also appropriate.

Combinations of atmospheres at different stages of the activation process can be employed for the present invention. For example, a first stage of activation can be conducted in an inert, an oxidizing or a reducing atmosphere and the second stage in an oxidizing atmosphere. Likewise, the first stage can be conducted in an inert, an oxidizing or a reducing atmosphere and the second stage in a reducing atmosphere. Any of the processes of the present invention can further comprise exchanging the atmosphere from one atmosphere to another during the first ramp up time or first holding period. For example, an oxidizing atmosphere of the first holding period may be exchanged for another oxidizing atmosphere, a reducing atmosphere or an inert atmosphere. Likewise, any inert atmosphere can be exchanged for another inert atmosphere, a reducing atmosphere or an oxidizing atmosphere. A reducing atmosphere can be exchanged for another reducing atmosphere, an oxidizing or an inert atmosphere.

The inventive process of selective shortening of ramp up and hold periods has little consequence on catalyst quality and significantly shortens the overall activation time, also referred to as total cycle time. Because the ramp up times R1, R2 and R3 of this invention are relatively short, the overall activation time is decreased. In one aspect of this invention, overall activation time (or cycle time) is less than about 20 hours. In another aspect, the overall activation time is less than about 15 hours. In still another aspect, the overall activation time is less than about 10 hours and in another aspect it is less than about 6 hours. In general, the overall activation time or total cycle time comprises the ramp up and hold times and any additional time required to operate the process. For example, the total cycle time can comprise time to cool the catalyst, time to position vessels or apparatus, and the like.

According to this invention, the percent of water in the atmosphere, including the moisture released by the catalyst, is less than about 70% during the first stage of the activation process. Alternatively the water content is less than about 50%, or less than about 10%. During the second stage of the activation process the percentage of water in the atmosphere can be adjusted to be less than about 30%, less than about 20% or less than about 10%. During the final hold period of the last performed stage of the process, the amount of water in the atmosphere was less than about 50,000 ppm, less than about 10,000 ppm or less than about 1000 ppm.

In the case of a batch activation mode, a vessel comprising a catalyst bed containing catalyst can be subjected to these stages sequentially and then the vessel and catalyst can be cooled and the activated catalyst can be discharged. Generally, the temperatures are ramped up over a period of time as the vessel is heated. Alternatively, it is possible to perform at least one stage of the batch process by subjecting the vessel containing the catalyst to a preheated environment, so that the ramp up time is instantaneous.

In the case of a continuous activation mode, any or all of the activation stages of the process can occur throughout a series of heated zones, through which the catalyst passes on its path through the activator vessel. In the case of a continuous activator, there is an instantaneous temperature change as the catalyst moves from one heated zone into another and the ramp times (R1, R2, and R3) would be negligible or instantaneous or about zero hours. Advantageously, the catalyst can be added to the activation apparatus continually and removed continually upon completion of the process when a continuous mode is used.

During activation the catalyst bed depth can range from about 0.1 to about 20 feet (0.03 to 6 meters). In other aspects the bed depth can range from about 1 to about 10 feet (0.3 to 3 meters), or from about 2 to about 8 feet (0.6 to 2.4 meters).

In one aspect of the invention, a two-step process for decreasing chromium catalyst activation time comprises heating a chromium catalyst by fluidization in dry air in a static batch process for less than 3 hours to a first temperature less than 700° C., maintaining the catalyst at the first temperature for a first hold period greater than 1 minute, heating in dry air for less than 1 hour to a second temperature greater than the first temperature, and maintaining at the second temperature for a second hold period greater than 1 hour. The total cycle time is less than 10 hours.

An alternative aspect of the invention comprises a batch process in which the catalyst is introduced in dry fluidizing air into a pre-heated environment heated to a first temperature less than 700° C., maintaining the catalyst at the first temperature for a first hold period greater than 1 minute, heating for less than 3 hours to a second temperature greater than the first temperature, still in dry air, and maintaining at the second temperature for a second hold period greater than 1 hour. The total cycle time is less than 10 hours.

Further aspects of the invention comprise a continuous activation process in which a chromium catalyst is introduced into a successive series of two or three heating zones, each set at the same or a higher temperature, in fluidizing dry air. The first zone is set at 600° C. or less, the final zone is set at 700-900° C., and the total activation time is less than 15 hours.

In an alternative aspect of the invention, a process for activating a chromium catalyst comprises using an inert or reducing fluidization gas in one or two stages of a batch or continuous process. A chromium catalyst is raised to a first temperature of about 700° C. or less, over a period of less than 3 hours and held at that temperature for greater than 1 minute. The catalyst is then heated for less than 1 hour to a second temperature greater than the first temperature, and maintained at the second temperature for a second hold period greater than 1 min. Finally it may, optionally, be heated to a third temperature, greater than or equal to, the previous temperature, and held there for a third hold period of greater than 1 minute. In this aspect, the catalyst is fluidized in dry inert or reducing atmosphere, in the first and/or second heating zone, and the final zone is in dry oxidizing atmosphere. The total cycle time is less than 15 hours.

In one aspect of the invention, increasing the output of chromium catalyst in an activation process is contemplated. A method for increasing the output of chromium catalyst activation comprises instantaneously subjecting a catalyst to a temperature of about 800° C. in a first atmosphere of nitrogen or carbon monoxide, maintaining the temperature for at least about 15 minutes, exchanging the first atmosphere for anhydrous air, and holding the catalyst at the temperature for an additional period of time.

Activated catalysts of the present invention can be used in any type of olefin polymerization reactor known in the art. For purposes of the invention, the term polymerization reactor includes any polymerization reactor known in the art that is capable of polymerizing olefin monomers to produce homopolymers or copolymers of the present invention. Such reactors can comprise slurry reactors, gas-phase reactors, solution reactors or any combination thereof. Gas phase reactors can comprise fluidized bed reactors or tubular reactors. Slurry reactors can comprise vertical loops or horizontal loops. Solution reactors can comprise stirred tank or autoclave reactors. Such reactors can be combined into multiple reactor systems operated in parallel or in series. The catalyst also may be used to produce ethylene polymers in a particle form process as disclosed in U.S. Pat. Nos. 3,624,063, 5,565, 175 and 6,239,235 which are incorporated by reference herein in their entirety.

A loop reactor is commonly used for a polymerization technique commonly referred to as particle form, or slurry process. For this process, the temperature is kept below the temperature at which the polymer swells or goes into solution. The temperature in the particle form process can be within a range of about 150° F. to about 230° F. (about 65° C. to about 110° C.), although higher or lower temperatures can sometimes be used. Polymerization methods for the slurry process can employ a loop reactor or utilize a plurality of stirred reactors either in series, parallel or combinations wherein the reaction conditions can be different in each of the reactors. Such polymerization techniques are disclosed in U.S. Pat. Nos. 3,248,179, 4,424,341; 4,501,885; 4,613,484; 4,737,280; and 5,597,892; which are incorporated by reference herein.

Activated catalysts of the present invention can be used for polymerization of homopolymers or copolymers from monomers. Monomers useful in the present invention are unsaturated hydrocarbons having from 2 to 20 carbon atoms. Monomers include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

The molecular weight of the polymer can be controlled by various means known in the art including but not limited to, adjusting the temperature (higher temperature giving lower molecular weight) and introducing, or varying the amount of hydrogen, or varying the catalyst compounds.

EXAMPLES

The present invention is further illustrated by the following examples, which are not to be construed in any way as imposing limitations upon the scope of the invention. On the contrary, it is to be clearly understood that resort may be had to various other aspects, embodiments, modifications, features, and equivalents thereof which, after reading the description herein, may suggest themselves to one of ordinary skill in the art without departing from the present invention or the scope of the appended claims.

To demonstrate the invention, three commercially available chromium catalysts were selected. Both 969MS and 969MPI catalysts were obtained from W.R. Grace Company, and EP30X was obtained from Inneos Company. These three catalyst grades are considered equivalent in that they all have a surface area of about 300 $m^2/g$, a pore volume of about 1.6 cc/g, an average particle size of about 90-100 microns, and contain a chromium loading of about 1 wt %.

Example 1

A laboratory procedure was designed to reproduce the longer procedure used for commercial activations. In a commercial process, about 600-750 lbs (272 to 340 Kg) of catalyst was introduced or charged to a vessel having a grid plate 42 inches (1.1 meters) in diameter. Dry air or other oxidizing atmosphere was blown up through the plate to fluidize the catalyst. Air was introduced at about 0.15 ft/sec (4.6 cm/sec), and the ramp up time, or period of increasing temperature, typically took about 10 hours to reach 800° C. Longer ramp up times can be used commercially to compensate for the increased moisture generated when proportionally deeper beds of catalyst are used. The larger catalyst charge releases more moisture, which can damage the catalyst. To compensate, the moisture release that accompanies the temperature rise is diluted in more air by slowing down the ramp up rate.

To reproduce commercial conditions for the laboratory studies, moisture was deliberately added to the fluidizing gas and controlled by bubbling the gas through a 25° C. water column before it was used for activation. This fluidizing gas then contained 100% humidity at room temperature. To obtain lower levels of humidity, the gas was either bubbled through an ice-water column, or the levels of humidity were further diluted with dry gas before being used for the activation procedure.

For the laboratory studies, about 10 grams of commercial catalyst was placed in a 1.75-inch (4.4 cm) quartz tube fitted with a sintered quartz disk at the bottom. While the catalyst was supported on the disk, the fluidization gas (air, nitrogen, or carbon monoxide) was blown up through the disk at the linear rate of about 0.1 to 0.3 ft/sec (3-9 cm/sec). An electric furnace was placed around the quartz tube in order to heat the tube. A thermocouple was placed inside the tube to monitor temperature, and the signal from the thermocouple was connected to an electronic controller that also supplied current to the heater. The controller could be programmed to raise the temperature of the fluidized bed at a fixed rate, and hold it at specified temperatures for specified periods of time.

For the control samples, the catalyst was fluidized in about 0.2 ft/sec (6 cm/sec) of dry air and the temperature was raised at the rate of about 60° C. to about 240° C. per hour to the desired temperature, typically around 800° C. At that temperature the catalyst was allowed to fluidize for three to five hours in the dry air. Afterward the catalyst was collected and stored under dry nitrogen, where it was protected from the atmosphere until ready for testing. Before that time it was never allowed to experience any exposure to the atmosphere.

In an alternative control sample, the activator tube was preset and heated to the desired temperature and the catalyst was simply sprinkled into the tube over about 30 sec. This constitutes an "instantaneous" temperature rise, sometimes referred to as a "drop in".

Hexavalent Cr analysis was performed by adding about 1 gram of catalyst into a 1N sulfuric acid solution. A few drops of 1,10-phenanthroline iron (II) sulfate, 0.025M in water, was used as an indicator. While stirring, the solution was titrated with a standardized solution of ferrous ammonium sulfate in water, until the indicator changed color. This solution was calibrated by reaction with potassium dichromate. The reaction was the reduction of Cr(+6) to Cr(+3) by oxidation of Fe(+2) to Fe(+3).

Polymerization runs were made in a 2.2 liter steel reactor equipped with a marine stirrer rotating at 400 rpm. The reactor was surrounded by a steel jacket containing boiling methanol and connected to a steel condenser. The boiling point of the methanol was controlled by varying the nitrogen pressure applied to the condenser and jacket. Electronic control instruments permitted precise temperature control to within half a degree centigrade.

Unless otherwise stated, a small amount (about 0.01 to about 0.10 grams) of the solid catalyst was first charged or added under an inert atmosphere of nitrogen to the dry reactor. Next, 1.2 liter of isobutane liquid was charged and the reactor heated up to the specified temperature, usually around 105° C. Finally, ethylene was added to the reactor to equal a fixed pressure, normally 550 psig (3.8 MPa), which was maintained during the experiment. The polymerization was allowed to continue for the specified time, usually around one hour, and the activity was noted by recording the flow of ethylene into the reactor to maintain the set pressure.

After the allotted time, the ethylene flow was stopped and the reactor slowly depressurized. The reactor was opened to recover a granular polymer powder. In all cases the reactor was clean with no indication of any wall scale, coating, or other forms of fouling. The polymer powder was then removed and weighed. The activity of the catalyst was calculated as grams of polymer produced per gram of solid catalyst charged per hour.

The ethylene monomer used for the tests was polymerization grade ethylene previously obtained from the former Union Carbide Corporation. This ethylene was then further purified through a column of ¼ inch (6 millimeter) beads of Alcoa A201 alumina, activated at 250° C. in nitrogen. Isobutane diluent was polymerization grade previously obtained from the former Phillips Petroleum Co., Borger, Tex. It was further purified by distillation and it too was then passed through a column of ¼ inch (6 millimeter) beads of Alcoa A201 alumina, activated at 250° C. in nitrogen.

To determine the effect of moisture on stabilization to hexavalent chromium, quartz activator tubes containing 10 grams each of 969MS catalyst were heated to various temperatures in air to which various amounts of moisture had been added. The data is plotted in FIG. 1. The rate of temperature rise was 1500° C. per hour, so that the longest ramp time was about thirty minutes. The catalysts were fluidized in the air of varying moisture levels for three hours at the temperature indicated, and then the catalyst was cooled down and tested for stabilization to Cr(+6). At 600° C. and below, stabilization was high and almost independent of moisture level. However, at higher temperatures, the moisture level became critical. The data demonstrates that in a two-stage activation, the first stage can be as high as 600° C. with a very fast rate of temperature rise, thus generating high moisture levels, without damage to the catalyst. Also, above 600° C. it can be advantageous to maintain a low moisture level during activation.

Example 2

To study the effect of moisture, the catalyst was dropped into a hot activator tube containing nitrogen at 30,000 ppm moisture instead of the atmosphere of air used in the previous test. After 15 minutes exposure, the atmosphere was then changed to dry air, and the catalyst was exposed for an additional 15 minutes. Results shown in FIG. 1 demonstrate that the Cr(+6) stabilization for the catalyst in this test was much higher in the activated catalyst than it was in a corresponding catalyst treated at 800° C. in air when both catalysts were treated at the same moisture level. Without intending to be limited by theory, it is believed that nitrogen protects the catalyst and that large crystallites of alpha-chromia grow more easily when traces of oxygen are present with moisture. [See Excess Oxygen of Chromia, I.; by M. P. McDaniel and R. L. Burwell, Jr.; *Journal of Catalysis*, Vol. 36, p. 394 (1975), and Excess Oxygen of Chromia, II. Reaction with Diphenylpicrylhydrazine; by M. P. McDaniel and R. L. Burwell, Jr.; *Journal of Catalysis*, Vol. 36, p. 404 (1975), and also The Activation of the Phillips Polymerization Catalyst, II. Activation by Reduction/Reoxidation; by M. B. Welch and M. P. McDaniel; *Journal of Catalysis*, Vol. 82, p. 110 (1983).] These crystallites are then very difficult to reoxidize and redisperse as Cr(+6). As demonstrated in FIG. 1, for a more efficient activation process, nitrogen or other non-oxidizing gasses can be used to remove moisture followed by a final oxidation to improve stabilization to Cr(+6).

Example 3

Thermogravimetric analysis was performed to determine the effect of temperature on hold time. The silica from the activated catalyst was subjected to a thermogravimetic analysis. Starting at room temperature each sample was heated in flowing nitrogen at 40° C. per hour up to 900° C. and the weight of the sample was monitored. Each sample lost weight as the temperature was raised, due to the loss of moisture.

Figure 2:
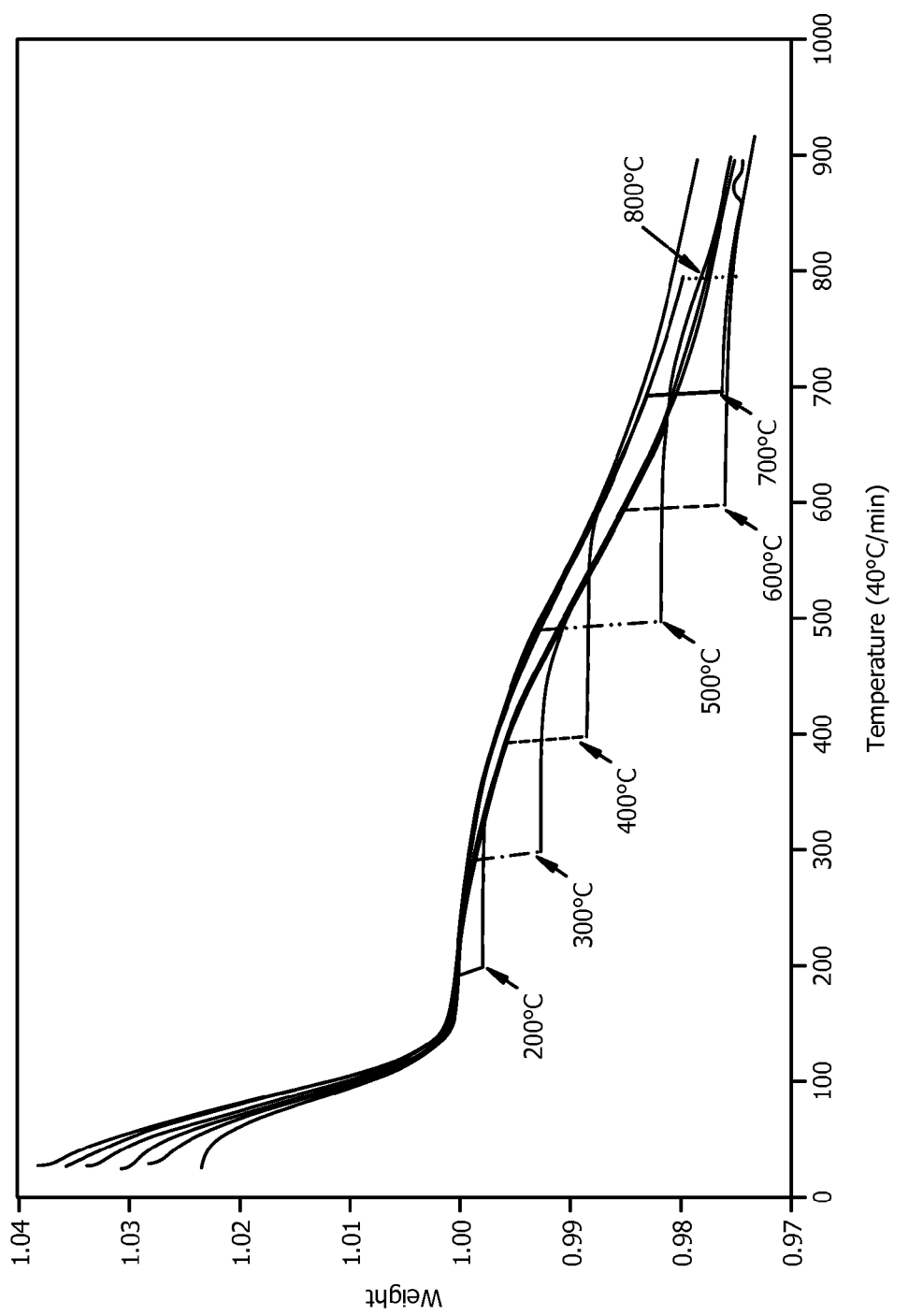
FIG. 2 is a graphic representation of thermogravimetric analysis demonstrating the equivalence of time and temperature in the dehydration of silica.

During each experiment, the temperature rise was halted at various temperatures from 200° C. to 800° C. where it was held for 24 hours. Afterward the temperature rise was continued at 40° C. per hour as before up to a maximum of 900° C. The data was plotted and the curves are shown in FIG. 2. The different activation sequences were tested and are described in Table 1. These catalysts were all activated using gas velocities of 0.12 ft/sec (3.7 cm/sec). A reading of greater than or equal to 0.4% Chromium(+6) was considered commercially acceptable activation.

TABLE 1

Figure 3:
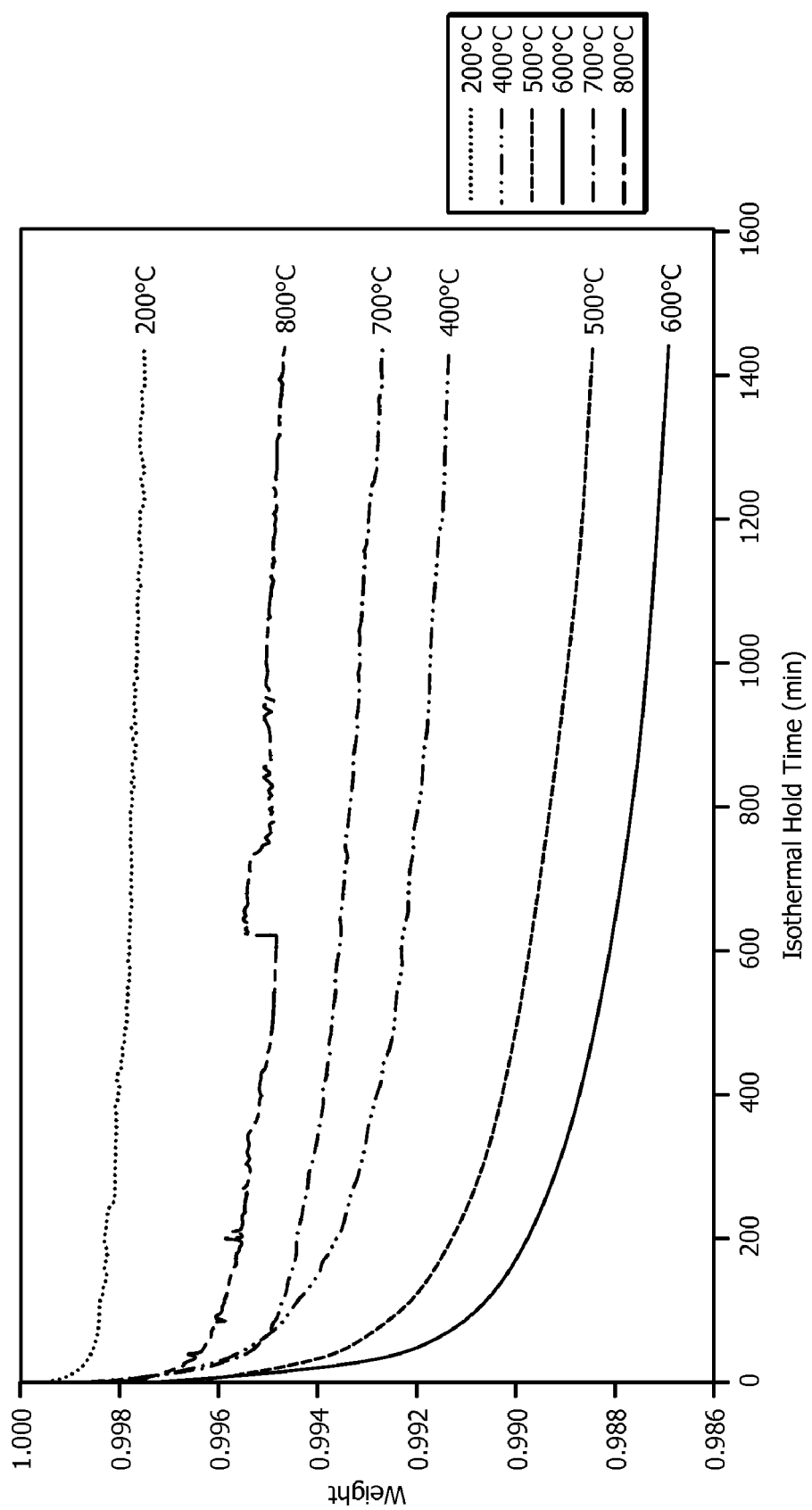
FIG. 3 is a graphic representation of thermogravimetric analysis demonstrating the weight loss of catalyst at various temperatures during the isothermal hold period.
Figure 4:
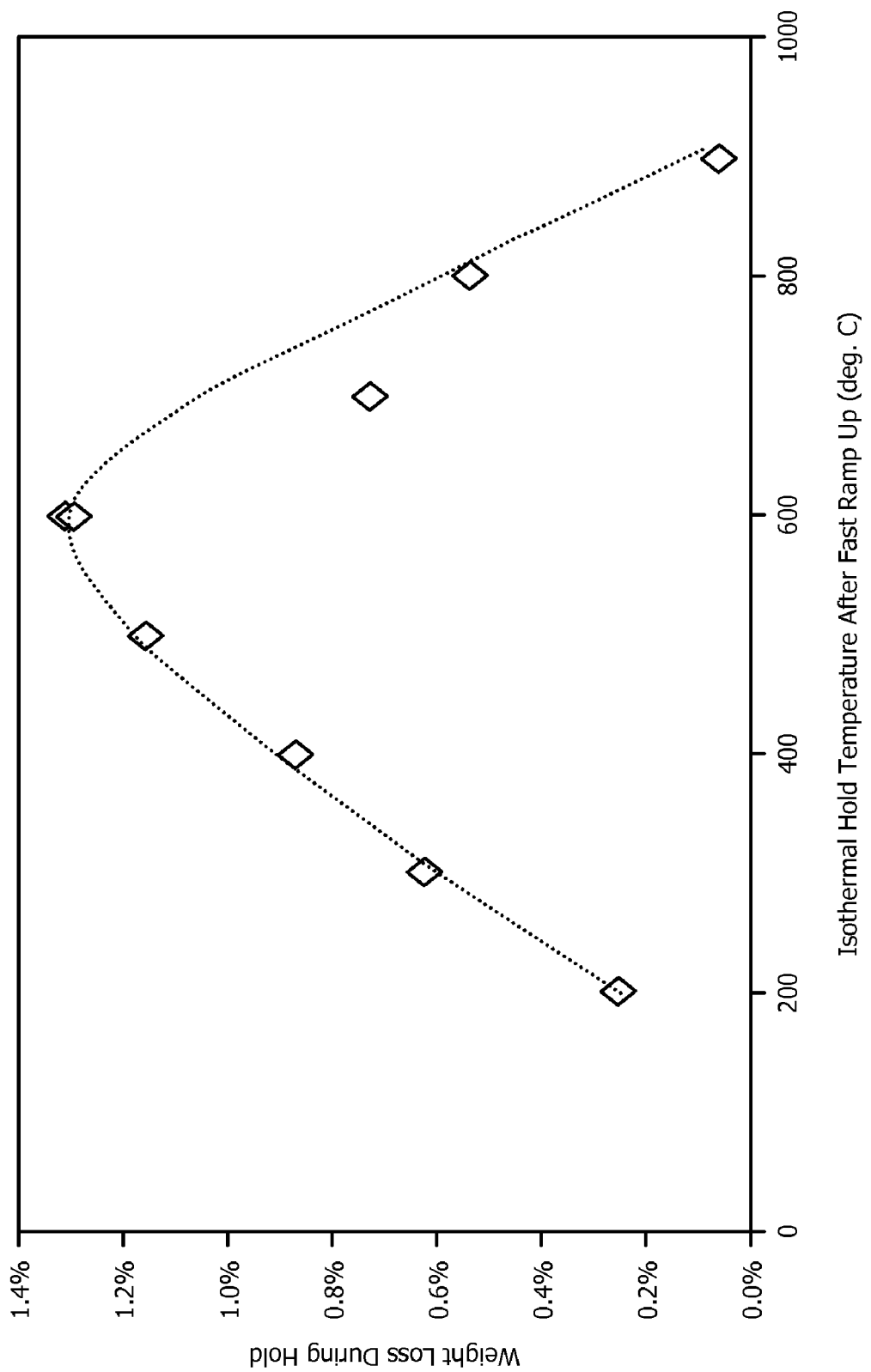
FIG. 4 is a graphic representation demonstrating the maximum weight loss of catalyst during the isothermal hold.

| Example # | Catalyst | First Stage | | | | | Second Stage | | | | | | Total |
| --- | --- | --- | --- | --- | --- | --- | --- | --- | --- | --- | --- | --- | --- |
| | | Raise Temp To: | Ramp Time (min) | Atmos. | Max % H2O | Hold Time | Raise Temp To: | Ramp Time (min) | Atmos. | Max % H2O | Hold Time | Color | % Cr(+6) | Cycle Time (min) |
| Control 1 | 969 MPI | 800° C. | 240 | Air | 0.2 | 3 hr | | | | | | Yellow | 0.5938 | 420 |
| Control 2 | 969 MPI | 800° C. | 1 | Air | 44.8 | 15 min | | | | | | Green | 0.346 | 16 |
| Control 3 | 969 MPI | 788° C. | 720 | Air | <1% | 12 hr | | | | | | Green | 0.4347 | 2160 |
| 4-1 | 969 MPI | 600° C. | 3 | Air | 12.7 | 15 min | 800° C. | 2 | air | 14.1 | 15 min | Green | 0.4477 | 35 |
| 4-2 | 969 MPI | 600° C. | 1 | Air | 38.1 | 15 min | 800° C. | 1 | air | 24.8 | 30 min | Green | 0.4694 | 47 |
| 4-3 | 969 MPI | 600° C. | 2 | Air | 19.0 | 24 hr | 800° C. | 1 | air | 24.8 | 30 min | Orange | 0.6641 | 1473 |
| 4-4 | EP 30X | 600° C. | 7 | Air | 5.4 | 15 min | 800° C. | 1 | air | 24.8 | 15 min | Orange | 0.571 | 38 |
| 4-5 | 969 MPI | 700° C. | 1 | Air | 41.1 | 15 min | 800° C. | 1 | air | 16.5 | 30 min | Green | 0.4937 | 47 |
| 4-6 | 969 MPI | 700° C. | 1 | Air | 41.1 | 24 hr | 800° C. | 1 | air | 16.5 | 30 min | Orange | 0.5964 | 1472 |
| 4-7 | 969 MPI | 600° C. | 1 | Air | 38.1 | 1 min | 800° C. | 13 | air | 2.5 | 15 min | Orange | 0.621 | 30 |
| 4-8 | 969 MSB | 800° C. | 1 | N2 | 44.8 | 7 min | 800° C. | 0 | air | <1% | 15 min | Green | 0.4394 | 23 |
| 4-9 | 969 MSB | 800° C. | 1 | N2 | 44.8 | 13 min | 800° C. | 0 | air | <1% | 30 min | Green | 0.4713 | 44 |
| 4-10 | 969 MSB | 800° C. | 1 | N2 | 44.8 | 1 min | 800° C. | 0 | air | <1% | 2 hour | Green-Yellow | 0.5226 | 122 |
| 4-11 | 969 MSB | 800° C. | 1 | N2 | 44.8 | 16 min | 800° C. | 0 | air | <1% | 4 hour | Yellow-Green | 0.5694 | 257 |
| 4-12 | 969 MSB | 800° C. | 1 | N2 | 44.8 | 15 min | 800° C. | 0 | air | <1% | 8 hour | Yellow-Green | 0.6119 | 496 |
| 4-13 | 969 MSB | 800° C. | 1 | N2 | 44.8 | 39 min | 800° C. | 0 | air | <1% | 20 hour | Beige Orange | 0.6634 | 1240 |
| 4-14 | 969 MPI | 560° C. | 0 | N2 | ~30 | 5 min | 788° C. | 0 | air | ~20% | 15 min | Yellow-Tan | 0.6542 | 20 |
| 4-15 | 969 MPI | 800° C. | 0 | CO | ~50 | 10 min | 800° C. | 0 | air | <1% | 10 min | Beige | 0.5817 | 20 |
| 4-16 | 969 MPI | 800° C. | 0 | CO | ~50 | 10 min | 800° C. | 0 | air | <1% | 10 min | Beige | 0.5736 | 20 |
| 4-17* | 969 MPI | 600° C. | 0 | Air | ~40 | 15 min | 800° C. | 0 | CO | ~25 | 10 min | Beige | 0.6511 | 25 |
| 4-18 | 969 MS | 300° C. | 0 | H2O N2 | 5 | 15 min | 800° C. | 0 | air | <1% | 15 min | Yellow-Tan | 0.6201 | 30 |
| 4-19 | 969 MS | 400° C. | 0 | H2O N2 | 5 | 18 min | 800° C. | 0 | air | <1% | 20 min | Yellow-Tan | 0.6893 | 38 |
| 4-20 | 969 MS | 500° C. | 0 | H2O N2 | 5 | 15 min | 800° C. | 0 | air | <1% | 18 min | Yellow-Tan | 0.6978 | 33 |
| 4-21 | 969 MS | 600° C. | 0 | H2O N2 | 5 | 19 min | 800° C. | 0 | air | <1% | 15 min | Yellow-Tan | 0.7185 | 34 |
| 4-22 | 969 MS | 700° C. | 0 | H2O N2 | 5 | 19 min | 800° C. | 0 | air | <1% | 15 min | Yellow-Tan | 0.6845 | 34 |
| 4-23 | 969 MS | 800° C. | 0 | H2O N2 | 5 | 19 min | 800° C. | 0 | air | <1% | 18 min | Yellow-Tan | 0.6245 | 37 | break in the curve represents the 24 hr isothermal hold period. The silica lost the most weight during the time when the temperature was halted at 500-600° C. This suggests that molecular motion begins to accelerate at that temperature. At still higher temperatures, the molecular motion is even faster and much of the moisture is lost before the isothermal hold begins. The weight loss during this isothermal hold period is shown in FIG. 3, which demonstrates the amount of weight loss for each temperature, and also how fast that moisture was lost. Thus, a maximum weight loss, plotted in FIG. 4, is seen at 500-600° C. This indicates that time and temperature can, to some degree, be considered as interchangeable. Short hold times at high temperature are equivalent, in terms of moisture loss, to long hold times at low temperature (at 500° C. and above).

Example 4

Using the information discussed above, various methods were designed for activating chromium catalysts using multiple steps to minimize the time cycle of an activation (thus increasing the output of an activator apparatus) or to improve the quality of the catalyst Cr(+6) stabilization. Numerous Control 1 shows the results of a typical 1-step lab activation, in which the temperature was ramped up to 800° C. at 60° C./hour, while the catalyst was fluidized in dry air. The bed depth was only about 2.5 inches (6.4 cm) in this test, which helped stabilization. The overall activation time (cycle time) was rather long, but the stabilization was high, due mainly to the small catalyst bed. Unfortunately, this exact sequence is not efficient enough for use on a large scale because of the limited bed depth.

Control 2 shows the results obtained when the same catalyst was simply dropped into a hot 800° C. tube, while in dry air. The catalyst was then allowed to fluidize at 800° C. for another 15 minutes before being discharged from the activator apparatus. This greatly reduced the cycle time, but this severe treatment also destroyed the catalyst, as indicated by the green color, the low Cr(+6) stabilization, and by activity tests on the polymer (Table 2) which indicated complete loss of activity.

Control 3, shows a typical commercial activation in which the bed depth was over 7 feet (2.1 meters). Although air velocity was higher in this run than the others, stabilization was still rather poor due to the large amount of catalyst used (750 lbs or 340 Kg). This much catalyst released considerable moisture, which hurt the stabilization. Stabilization was low in spite of the exceedingly long cycle time of 36 hours.

Samples 4-1 through 4-23 in Table 1 demonstrate other sequences using activation scenarios that are adaptable to continuous activation, or to large scale batch activation, while showing considerable increase in efficiency and in stabilization to Cr(+6). The parameters of the studies are listed in Table 1 for the following examples.

Example 4A

For samples 4-1 through 4-7, the catalyst was fluidized in an oxidizing atmosphere of air and rapidly ramped up to a first temperature followed by a first hold period. The catalyst was then ramped up in an atmosphere of air to a second temperature that was greater than the first temperature and then held for a second hold period. Even at total cycle times of less than 60 minutes the amount of Cr(6+) recovered was greater than 0.45 wt %.

Example 4B

For samples 4-8 through 4-14, catalyst was fluidized in an inert atmosphere of nitrogen and rapidly ramped up to a first temperature followed by a first hold period. The catalyst was then ramped up in an atmosphere of air to a second temperature that was greater than or equal to the first temperature and then held for a second hold period. Even at total cycle times of less than 20 minutes the amount of Cr(6+) recovered was commercially acceptable.

Example 4C

Samples 4-15 through 4-16, catalyst was fluidized in a reducing atmosphere of carbon monoxide and rapidly ramped up to a first temperature followed by a first hold period. The catalyst was then ramped up in an atmosphere of air to a second temperature that was greater than or equal to the first temperature and then held for a second hold period. Even at total cycle times of about 20 minutes the amount of Cr(6+) recovered was commercially acceptable.

Example 4D

Sample 4-17, catalyst was fluidized in an oxidizing atmosphere of ambient air and rapidly ramped up to a first temperature followed by a first hold period. The catalyst was then ramped up in an atmosphere of air to a second temperature that was greater than or equal to the first temperature and then held for a second hold period. The catalyst was then subjected to a reducing atmosphere of CO for an additional 15 minutes. Even at total cycle times of about 25 minutes the amount of Cr(6+) recovered was commercially acceptable.

Example 4E

Samples 4-18 to 4-23, catalyst was instantaneously added to a pre-heated activator in an oxidizing, reducing, or inert atmosphere and held for a first period of time. The catalyst was then ramped up to a second temperature greater than the first temperature in an atmosphere of air and held for a second period of time. Stabilization to Cr(6+) was commercially acceptable.

Polymerization reactions were conducted using the activated catalyst recovered from the examples and the resulting polymer was tested for various properties. Melt index (MI, g/10 min) was determined in accordance with ASTM D1238 condition F at 190° C. with a 2,160 gram weight. High load melt index (HLMI, g/10 min) was determined in accordance with ASTM D1238 condition E at 190° C. with a 21,600 gram weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:

$|\eta^*(\omega)|$=magnitude of complex shear viscosity;

$\eta_0$=zero shear viscosity $\tau_\eta$=viscous relaxation time a="breadth" parameter n=fixes the final power law slope, fixed at $2/11$; and $\omega$=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety. In Table 2, the zero shear viscosity is reported as Eta 0, the viscous relaxation time as Tau eta, and the breadth parameter as "a".

Table 2 demonstrates the results of polymerization runs with these catalysts. Melt index and HLMI are presented in grams/10 minutes. The amount of polyethylene resin recovered is listed in grams under the heading "PEg". Productivity is referred to as "Prod" in the table and was determined by dividing the grams of resin produced by the grams of catalyst used for the polymerization run. Activity was determined by calculating the productivity per hour (grams of resin/grams of catalyst/hour). The amount of catalyst charged to the reactor is labeled as "Cat Chg" and is in grams.

One can see that despite the faster rate of activation, the inventive catalysts displayed equivalent or improved activity over the control catalysts, while providing higher melt index potential.

TABLE 2

Polymerization Runs

| Example # | Cat Chg | PE g | Run Time | Prod (g/g) | Activity (g/g-h) | Melt Index | HLMI | HLMI/MI | Eta_0 | Tau_eta | "a" |
|---|---|---|---|---|---|---|---|---|---|---|---|
| Control 1 | 0.1451 | 260 | 70 | 1793 | 1537 | 0.20 | 16.1 | 78.6 | | | |
| Control 2 | 0.0926 | 60 | 49 | 49 | | | | | | | |
| Control 3 | 0.091 | 330 | 95 | 3626 | 2290 | 0.16 | 14.4 | 90.5 | 3.75E+05 | 1.23 | 0.1837 |
| 4-7 | 0.1937 | 301 | 57 | 1554 | 1636 | 0.57 | 36.8 | 64.5 | 9.89E+04 | 0.19 | 0.1860 |
| 4-14 | 0.1119 | 224.2 | 50 | 2004 | 2404 | 0.25 | 18.7 | 74.0 | | | |
| 4-16 | 0.1444 | 249 | 68.9 | 1724 | 1502 | 0.41 | 27.1 | 66.1 | 1.64E+05 | 0.31 | 0.1793 |
| 4-17 | 0.1417 | 262 | 60 | 1849 | 1849 | 0.14 | 12.9 | 89.7 | 3.72E+05 | 0.96 | 0.1834 |

The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein. If the teachings or terms of the reference are inconsistent with those of the present invention, the information included in the specification for the present invention is intended.

The inventive aspects described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

What is claimed is:

1. A chromium catalyst activation process comprising:
subjecting the catalyst to at least two activation stages,
wherein a first activation stage comprises an environment heated to a first temperature prior to introduction of the catalyst for a first hold time in a range of from about 1 minute to about 30 hours, and
wherein a second activation stage comprises an environment heated to a second temperature for a second hold time in a range of from about 1 minute to about 30 hours.

2. The process of claim 1 wherein the environment heated to a second temperature is heated during a ramp up time in a range of from about instantaneous to less than or equal to about 3 hours.

3. The process of claim 1 wherein the environment heated to a second temperature is preheated to the second temperature prior to introduction of the chromium catalyst.

4. The process of claim 1 wherein the first and second activation stages are carried out in a common heating zone.

5. The process of claim 1 wherein the first and second activation stages are carried out in different heating zones.

6. The process of claim 1 wherein the activation process operates in a batch mode or a continuous mode.

7. The process of claim 1 wherein the first temperature is equal to or less than about 700° C.

8. The process of claim 1 wherein the first temperature is in a range of from equal to or greater than about 400° C. to equal to or less than about 700° C.

9. The process of claim 1 wherein the second temperature is in a range of from greater than about 700° C. to equal to or less than about 1000° C.

10. The process of claim 1 wherein the second temperature is in a range of from equal to or greater than about 800° C. to equal to or less than about 900° C.

11. The process of claim 1 wherein the first hold time is in a range of from equal to or greater than 1 hour to equal to or less than 20 hours.

12. The process of claim 1 wherein the second hold time is in a range of from equal to or greater than 1 hour to equal to or less than 10 hours.

13. The process of claim 1 wherein the first stage, the second stage, or both comprises an atmosphere of air.

14. The process of claim 1 wherein the first stage, the second stage, or both comprises an atmosphere of nitrogen, carbon dioxide, or mixtures thereof.

15. The process of claim 1 wherein the activation process is a continuous process and further comprising adjusting a percentage of water in the environment of the second stage activation stage to less than about 30 mol %.

16. The process of claim 1 wherein the activation process is a continuous process, wherein a percentage of water in the environment of the first stage is no more than about 50 mol %, and wherein a percentage of water in the environment of the second stage is no more than about 1 mol %.

17. The process of claim 1 wherein the activation process is a continuous process, wherein a percentage of water in the environment of the first stage is no less than about 5 mol %, and wherein a percentage of water in the environment of the second stage is no more than about 1 mol %.

18. The process according to claim 1 wherein the process results in formation of activated catalyst and wherein from about 40% to about 100% of the total chromium present in the activated catalyst is hexavalent chromium.

19. A chromium catalyst activation process comprising:
introducing a chromium catalyst to a heating zone preheated to a first temperature prior to introduction of the chromium catalyst;
holding the heating zone at the first temperature for a first hold time in a range of from about 1 minute to about 30 hours;
increasing the heating zone to a second temperature greater than the first temperature; and
holding the heating zone at second temperature for a second hold time in a range of from about 1 hour to about 30 hours.

20. The process of claim 19 wherein the heating zone is increased to a second temperature during a ramp up time in a range of from about instantaneous to less than or equal to about 3 hours.

21. The process of claim 19 wherein the heating zone is increased to a second temperature instantaneously.

22. A chromium catalyst activation process comprising:
introducing a chromium catalyst to a first heating zone preheated to a first temperature prior to introduction of the chromium catalyst;
holding the catalyst within the first heating zone for a first hold time in a range of from about 1 minute to about 30 hours;
introducing the chromium catalyst to a second heating zone preheated to a second temperature prior to introduction of the chromium catalyst, wherein the second temperature is greater than the first temperature; and
holding the catalyst within the second heating zone for a second hold time in a range of from about 1 minute to about 30 hours.

* * * * *